United States Patent [19]

Watanabe et al.

[11] Patent Number: 5,504,766
[45] Date of Patent: Apr. 2, 1996

[54] CONTROLLER FOR LASER BEAM OSCILLATOR

[75] Inventors: Atsushi Watanabe; Yoshitaka Ikeda, both of Minamitsuru, Japan

[73] Assignee: Fanuc, Ltd., Minamitsuru, Japan

[21] Appl. No.: 453,510

[22] Filed: May 30, 1995

Related U.S. Application Data

[63] Continuation of Ser. No. 142,346, Nov. 23, 1993, abandoned.

[30] Foreign Application Priority Data

Apr. 13, 1992 [JP] Japan .................................. 4-092737

[51] Int. Cl.⁶ ......................................................... H01S 3/00
[52] U.S. Cl. ......................................................... 372/38
[58] Field of Search ................................... 372/29–31, 38

[56] References Cited

U.S. PATENT DOCUMENTS

| | | | |
|---|---|---|---|
| 4,630,273 | 12/1986 | Inoue et al. | 372/38 |
| 4,817,100 | 3/1989 | Cameron et al. | 372/32 |
| 5,268,914 | 12/1993 | Yamamuro et al. | 372/31 |

FOREIGN PATENT DOCUMENTS

| | | |
|---|---|---|
| 59-39957 | 3/1984 | Japan . |
| 63-318180 | 12/1988 | Japan . |
| 1-154580 | 6/1989 | Japan . |
| 2-1189 | 1/1990 | Japan . |
| 4-23373 | 1/1992 | Japan . |
| 4-63169 | 5/1992 | Japan . |
| 4-63666 | 5/1992 | Japan . |

*Primary Examiner*—Leon Scott, Jr.
*Attorney, Agent, or Firm*—Staas & Halsey

[57] ABSTRACT

A controller for a laser beam oscillator capable of notifying an operator of a proper timing at which a discharge tube, oscillation lamp and the like must be replaced. When a part of the laser beam oscillator is replaced, a processor calculates the integrated operating time value and integrated laser beam output value of the laser beam oscillator since the replacement of the part and displays these values on a CRT. Further, the processor determines the remaining life of the part from these integrated values and when the life is near to its expiring time, an alarm display is indicated on the CRT and an alarm lamp is lit on an operation panel.

8 Claims, 2 Drawing Sheets

CONTROLLER FOR LASER BEAM OSCILLATOR

This application is a continuation of application Ser. No. 08/142,346, filed Nov. 23, 1993, now abandoned.

TECHNICAL FIELD

The present invention relates to a controller for a laser beam oscillator to control the same, and more specifically, to a controller for a laser beam oscillator to manage the life of a discharge tube, oscillation lamp and the like.

BACKGROUND ART

Conventionally, a method of ascertaining a timing at which consumable parts such as a discharge tube, oscillation lamp and the like of a laser beam oscillator must be replaced is such that consumed parts are replaced with new parts when these consumable parts completely fail and the laser beam oscillator cannot be operated or when an operation time predetermined to each of the consumable parts has elapsed.

Nevertheless, when the operation of the laser beam oscillator has actually stopped, it is not always caused by the consumption of the discharge tube, oscillation lamp and the like. Therefore, the method of replacing parts after the laser beam oscillator cannot be operated has a problem in that a job for investigating the reason why the oscillator is stopped needs considerable labor and the recovery thereof requires a long time.

Further, a degree of consumption of parts changes depending upon a laser beam output therefrom even if they are operated for the same time. Consequently, in the method of replacing parts after they have been operated for a predetermined time, there is a possibility that parts which are still sufficiently usable may be discarded.

SUMMARY OF THE INVENTION

Taking the above into consideration, an object of the present invention is to provide a controller for a laser beam oscillator capable of notifying an operator of a proper timing at which consumable parts such as a discharge tube, oscillation lamp and the like must be replaced.

To solve the above problem, according to the present invention, there is provided a controller for controlling a laser beam oscillator, which comprises laser beam output calculation means for calculating values obtained by multiplying instantaneously output laser beam values and operating times of the laser beam oscillator and calculating an integrated laser beam output value obtained by integrating all the multiplied values since the replacement of a part of the laser beam oscillator, operating time calculation means for calculating an integrated operating time value obtained by integrating all the operating times since the replacement of the part, and notification means for notifying an operator of a degree of consumption of the part based on the integrated laser beam output value and the integrated operating time value.

BEST MODE OF CARRYING OUT THE INVENTION

An embodiment of the present invention will be described below with reference to the drawings.

Figure 1:
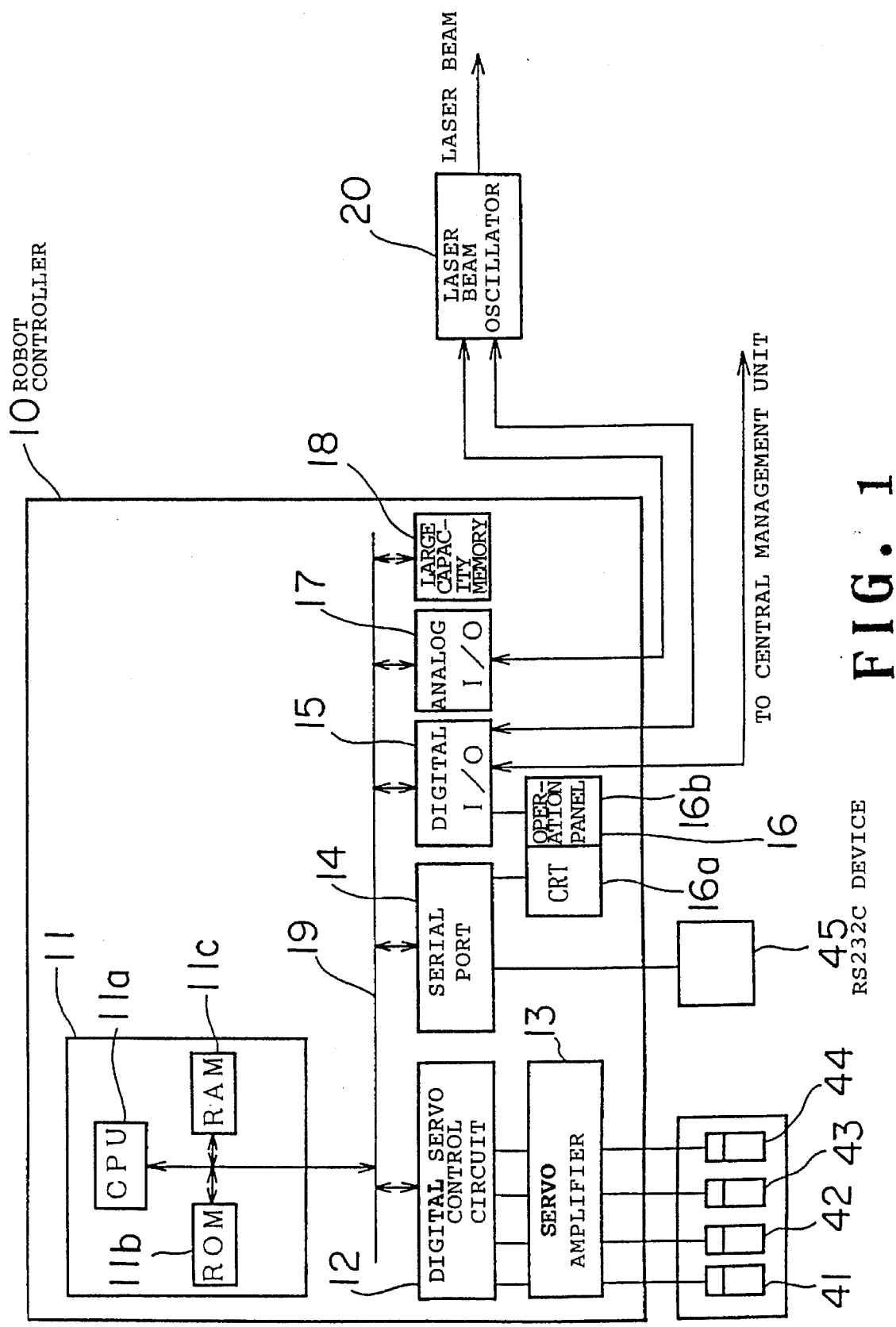
FIG. 1 is a block diagram showing the arrangement of a robot controller on which a laser beam oscillator is mounted.

FIG. 1 is a block diagram showing the arrangement of a robot controller 10 on which a laser beam oscillator is mounted. The robot controller 10 includes a processor board 11 disposed therein and the processor board 11 includes a processor 11a, ROM 11b and RAM 11c. The processor 11a controls the robot controller 10 as a whole in accordance with a system program stored in the ROM 11b.

The RAM 11c stores various kinds of data, the operation program of a not shown robot, the output command program to the laser beam oscillator 20, and the like. A portion of the RAM 11c is arranged as a non-volatile memory which stores the operation program, output command program and the like. Further, the non-volatile memory also stores a life management program to be described later and the data of an integrated operating time value, the data of an integrated laser beam output value and the like each needed by the life management program.

A digital servo control circuit 12, serial port 14, digital I/O unit 15, analog I/O unit 17 and large capacity memory 18 are connected to the processor board 11 through a bus 19.

The digital servo control circuit 12 controls servo motors 41, 42, 43 and 44 for operating the respective axes of the robot, through a servo amplifier 13 in response to a command from the processor board 11.

The serial port 14 is connected to another RS232C device 45. Further, the CRT 16a on an operator's panel 16 is connected to the serial port 14. The CRT 16a displays an integrated laser output value and integrated operating time value since the replacement of respective parts of the laser beam oscillator 20 such as a discharge tube, oscillation lamp and the like. Here, the integrated laser beam output value is determined by summing values obtained by multiplying instantaneous output values of the laser beam oscillator 20 by the operating times thereof since the replacement of a part. In addition, the integrated operating time value is the total operating time of the laser beam oscillator 20 since the replacement of the part. The integrated laser beam output value and integrated operating time value are calculated and displayed for each part. Further, when the life of each part expires, an alarm is displayed.

The operation panel 16b of the operator's panel 16 is connected to the digital I/O unit 15. A not shown alarm lamp is provided with the operation panel 16b and lit when the life of parts such as the discharge tube and the like expires. Further, the digital I/O unit 15 is connected to a central management unit for controlling a factory as a whole and to other peripheral units and transmits a signal to and receives a signal from these units. The digital I/O unit 15 is further connected to the laser beam oscillator 20, and transmits a digital signal to and receives a digital signal from the laser beam oscillator 20. This digital signal includes the data of laser machining conditions to be output to the laser beam oscillator 20, a laser beam output sensing signal input from a not shown laser beam output sensor attached to the discharge tube, and the like.

The analog I/O unit 17 is used to output an analog signal to the laser beam oscillator 20. The laser beam oscillator 20 outputs a laser beam in accordance with the analog signal. The output laser beam is transmitted to a robot hand through a transmission pipe and irradiated to a workpiece. The large capacity memory 18 stores teaching data, the data base of a machining condition menu, and the like.

Next, the life management control of parts of the laser beam oscillator 20 effected by the robot controller 10, arranged as described above, will be described.

Figure 2:
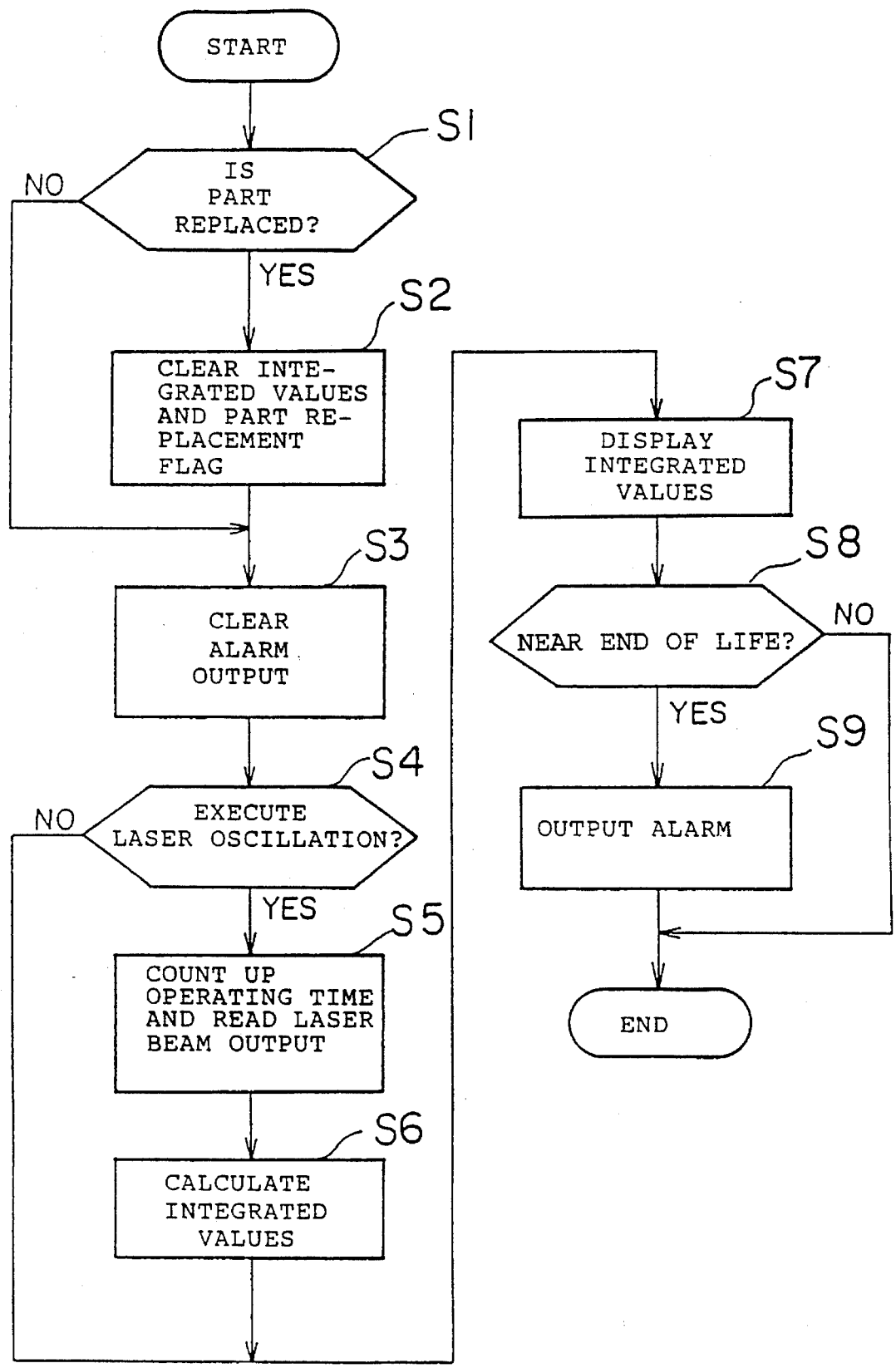
FIG. 2 is a flowchart showing a procedure for managing the life of various parts of the laser beam oscillator.

FIG. 2 is a flowchart showing a procedure for managing the life of the parts of the laser beam oscillator 20.

[S1] Whether a consumed part is replaced with a new one or not is determined, and when the used part is replaced, the flow goes to step S2, and when it is not replaced, the flow goes to step S3.

[S2] The integrated laser beam output value and integrated operating time value of the replaced part are calculated before the replacement thereof and a part replacement flag on a program is cleared.

[S3] An alarm output is cleared.

[S4] It is determined whether or not the laser beam oscillator 20 is operated and executes laser oscillation, and if so, the flow goes to step S5, and if not so, the flow goes to step S7.

[S5] The operating time of the laser beam oscillator 20 since the replacement of the part is counted up and a laser beam output sensing signal is read from the laser output sensor.

[S6] The integrated operating time value and integrated laser beam output value of the laser beam oscillator 20 are calculated since the replacement of the part.

[S7] The respective integrated values calculated at step S6 are displayed on the CRT 16a. As a display example at this time, the integrated operating time value is displayed in a unit of hour (h), whereas the integrated laser beam output value is displayed in a unit of kilowatt/hour (kw/h). In addition, the integrated operating time value and integrated laser beam output value are displayed with respect to each part.

[S8] A difference between the integrated laser beam output value and a preset laser beam output life determination value and a difference between the integrated operating time value and a preset operating time life determination value are calculated and when both of these values are equal to or less than predetermined values, the life of the part is determined to be near to its expiring time and the flow goes to step S9. On the other hand, when the life of the part is not near to its expiring time, the flowchart is finished.

[S9] An alarm is output so that the CRT 16a displays the alarm and the alarm lamp on the operation panel 16b is lit.

As described above, according to the present invention, since the integrated operating time value and integrated laser beam output value of the laser beam oscillator 20 are calculated since the replacement of a part and an alarm is output by determining the life of the part from these values, a degree of consumption of the part can be securely found in proportion to the operating frequency of the part. Therefore, a consumed part can be replaced at a proper timing as well as the laser beam oscillator 20 being prevented from being disabled by the consumed part. Further, when the laser beam oscillator 20 is disabled, whether it is caused by the consumption of a part or not can be securely determined. As a result, the maintenance of the laser beam oscillator 20 can be executed easily.

Note, although the laser beam oscillator 20 is connected to the robot controller 10 in the present embodiment, this embodiment can be also applied to the case in which the laser beam oscillator 20 is connected to a numerical control apparatus and the like.

Further, although a laser beam output sensing signal from the laser beam output sensor is used as a parameter showing a laser beam output, an output command signal from the robot controller 10 to the laser beam oscillator 20, a voltage value imposed on the discharge tube or the like may be used in addition to the above signal.

As described above, according to the present invention, because the integrated values of the laser beam output and operating time are calculated, respectively, since the replacement of a part of the laser beam oscillator and a degree of consumption of the part is provided to an operator, the degree of consumption of the part can be securely found in proportion to the operating frequency thereof.

Consequently, consumed parts can be replaced at a proper timing as well as the laser beam oscillator being prevented from being disabled by the consumed parts. Further, when the operation of the laser beam oscillator is disabled, whether it is caused by the consumption of parts or not can be securely determined. Therefore, maintenance can be executed easily.

We claim:

1. A controller for controlling operating states of a laser beam oscillator to output a laser beam during operating times, the laser beam oscillator having a replaceable part with a usable life expectancy and placed in the laser beam oscillator at a replacement time, said replaceable part being one of a discharge tube, an oscillation lamp, and an optical element, said controller comprising:

laser beam output calculation means for multiplying instantaneously output laser beam power values of the laser beam and the corresponding operating times of the laser beam oscillator to produce a plurality of multiplied values, and for integrating the plurality of multiplied values since the replacement time of the part of the laser beam oscillator to produce an integrated laser beam output value;

operating time calculation means for integrating all operating times of the part since the replacement time of the part to produce an integrated operating time value; and notification means for notifying an operator of a percentage of the usable life expectancy of the part which has expired based on the integrated laser beam output value and the integrated operating time value as compared to a preset laser beam output life determination value and a preset operating time life determination value, respectively.

2. A controller for a laser beam oscillator according to claim 1, wherein said notification means comprises display means for displaying the integrated laser beam output value and the integrated operating time value.

3. A controller for a laser beam oscillator according to claim 1, wherein said notification means comprises:

life calculation means for determining a difference between the integrated laser beam output value and a preset laser beam output life determination value to produce a laser beam output setting value, and for determining a difference between the integrated operating time value and a preset operating time life determination value to produce an operating time setting value; and alarm means for issuing an alarm when the laser beam output setting value and the operating time setting value are not greater than predetermined values, respectively.

4. A controller for a laser beam oscillator according to claim 1, wherein said controller outputs output command values to said laser beam oscillator to output the laser beam, wherein the output command values are used as the instantaneously output laser beam values.

5. A controller for a laser beam oscillator according to claim 1, further comprising an output sensor, mounted on the laser beam oscillator, for sensing the instantaneously output laser beam values output by the laser beam oscillator.

6. A controller for a laser beam oscillator according to claim 1, wherein said controller provides voltages with corresponding voltage values to a discharge tube of the laser beam oscillator and determines the instantaneously output laser beam value based on the voltage values.

7. A controller for controlling operating states of a laser beam oscillator to output a laser beam during operating times, the laser beam oscillator having a part which is replaceable and is placed in the laser beam oscillator at a given time and which has a usable life expectancy, said part being one of a discharge tube, an oscillation lamp and an optical element, said controller comprising:

laser beam output calculation means for determining the given time, multiplying instantaneously output laser beam power values of the laser beam and corresponding operating times of the laser beam oscillator to produce a plurality of multiplied values, and for integrating the plurality of multiplied values subsequent to the given time to produce an integrated laser beam output value;

operating time calculation means for integrating all of the operating times subsequent to the given time to produce an integrated operating time value indicative of a total time of operation of the part since being placed in the laser beam oscillator; and means for indicating a percentage of the usable life expectancy of the part which has expired based upon the integrated laser beam output value and the integrated operating time value as compared to first and second preset values, respectively.

8. A controller as claimed in claim 7, wherein said means for indicating a percentage of the usable life expectancy comprises:

means for determining when the integrated laser beam output value exceeds a first preset value;

means for determining when the integrated operating time value exceeds a second preset value; and alarm means for issuing an alarm when the integrated laser beam output value exceeds the first preset value and the integrated operating time value exceeds the second preset value.

* * * * *